March 24, 1964
C. E. NORTON
3,125,901
TWO-SPEED MECHANICAL TRANSMISSION
Filed Oct. 12, 1962
2 Sheets-Sheet 1
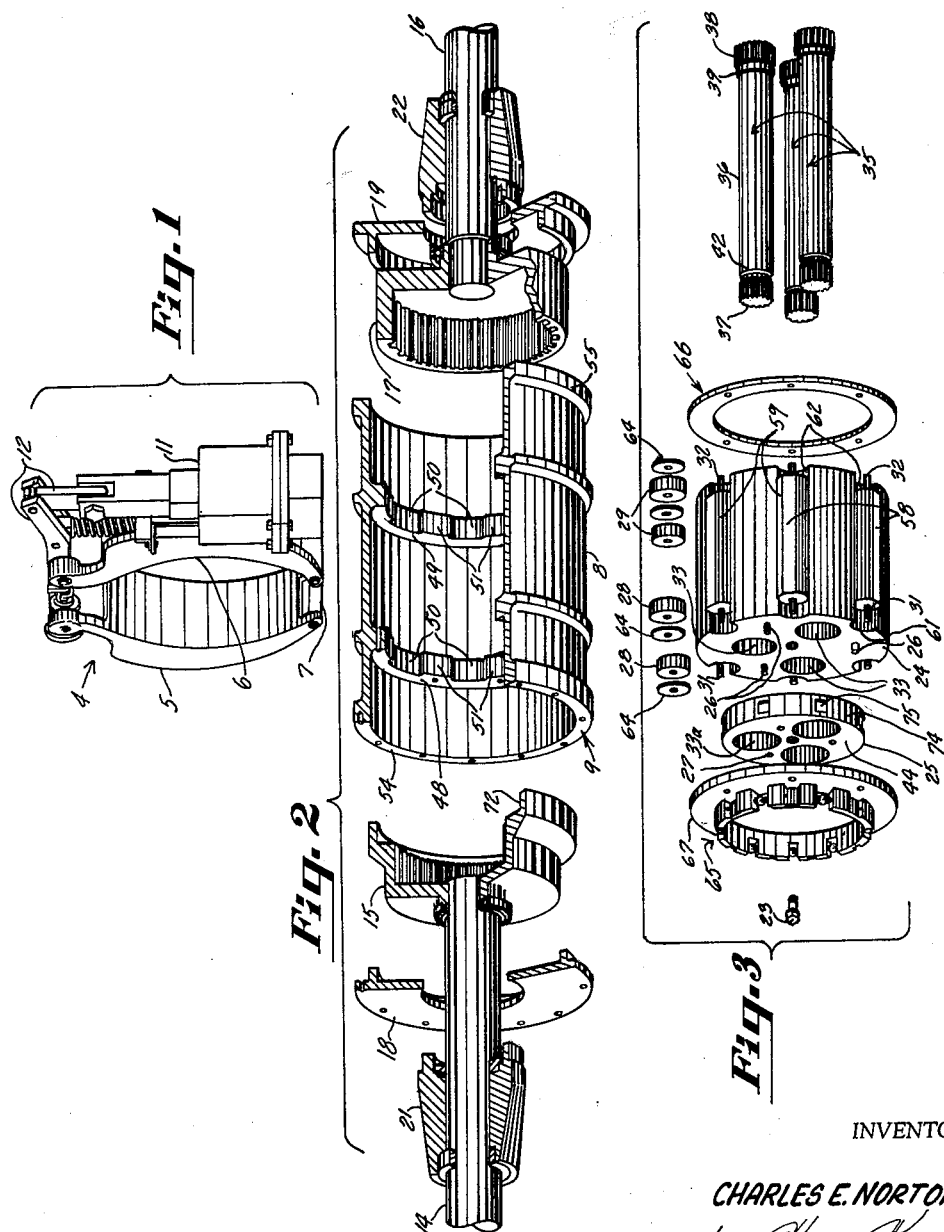
INVENTOR.
CHARLES E. NORTON
by Henry Kozak
ATTORNEY

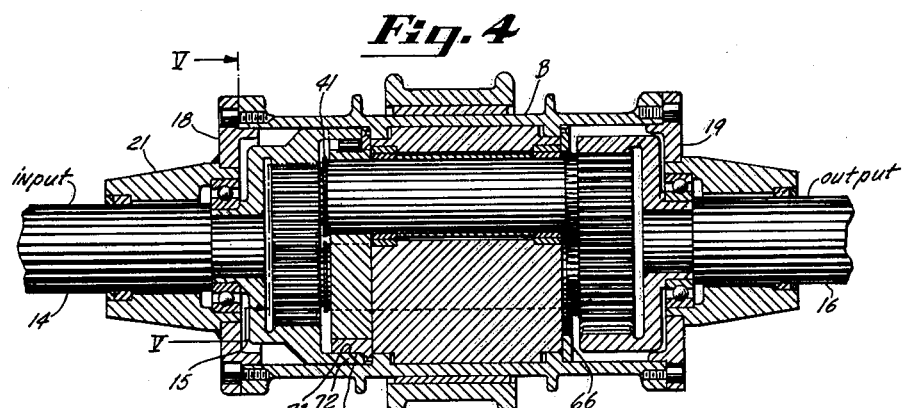
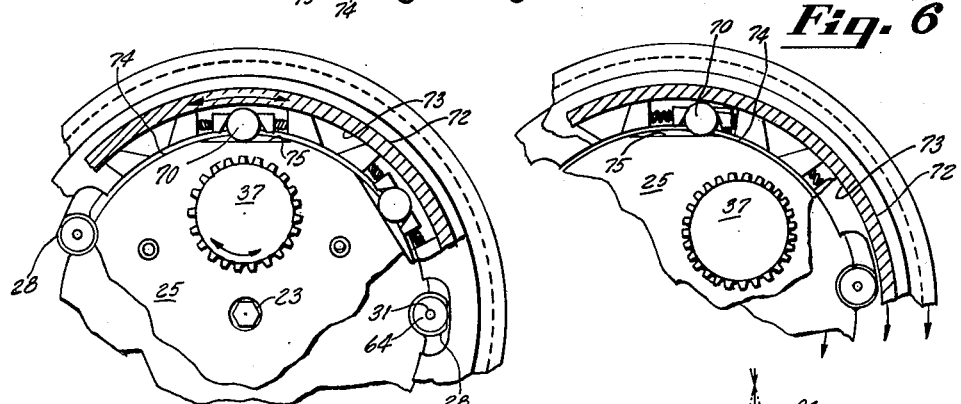
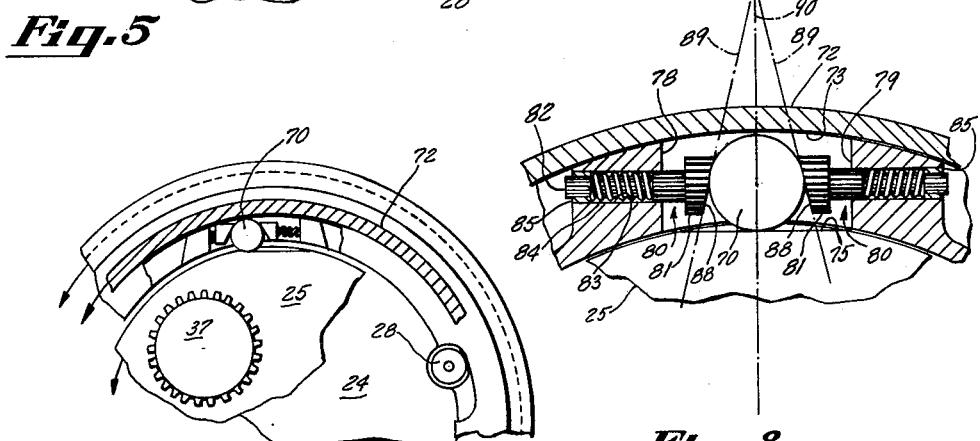

United States Patent Office 3,125,901
Patented Mar. 24, 1964

3,125,901
TWO-SPEED MECHANICAL TRANSMISSION
Charles E. Norton, Chicago, Ill., assignor to National Castings Company, Cleveland, Ohio, a corporation of Ohio
Filed Oct. 12, 1962, Ser. No. 230,069
10 Claims. (Cl. 74—789)

The present invention relates to a two-speed planetary-type transmission providing two-speed operation in both directions of rotation. That is to say, this transmission provides two-speed or overdrive operation with equal facility in either clockwise or counterclockwise rotation and is thus particularly suited for many industrial uses requiring reversible two-speed operation of processing equipment, e.g., conveyors or work feeding devices. Speed transmissions of this general character are commonly known as "overdrives."

Hence, it is a primary object of this invention to provide a transmission of the overdrive type permitting speed changing in either direction of rotation.

A further object is to provide clutch mechanism enabling two-speed two-way operation applicable in general to planetary-type speed-changing devices.

Still another object is to provide transmissions in accordance with the foregoing objects with the construction thereof arranged for ease of assembly and ease of installation between coaxial shafts connected in power transmitting relationship.

According to the invention, there is provided a planetary speed-changing transmission which, in its simplest form, comprises an outer housing, an input gear, an output gear, and a rotor disposed between the gears, all supported by the housing, in coaxial relationship. The transmission further comprises one or more planetary spindles carried by the rotor in bearing relation therewith. Each spindle comprises pinions in mesh with both the input gear and the output gear, stops on the housing and the rotor cooperating to permit a limited range of movement of the rotor relative to the casing. The rotor and a non-tooth portion of one of the gears extend into axially overlapping relationship to define opposed surfaces spaced in a radial direction and converging in circumferential direction through a small angle about the transmission axis to form a region therebetween tapered in one or both circumferential directions.

An important provision of the invention is that the housing has lugs or other projections extending in an axial direction into the tapered region with a pair of such lugs being spaced in a circumferential direction to provide a gap; and that a chock is disposed loosely in the gap having a dimension in the radial direction relative to the axis of the transmission less than the maximum spacing and greater than the minimum spacing between the above-named opposing surfaces forming the tapered region. In a preferred embodiment, the region tapers in opposite circumferential directions from a central portion and means such as spring loaded pushers urge the chock, preferably a roller, toward a neutral position between the lugs.

In the drawings with respect to which the invention is described below:

FIG. 1 is a perspective view of drum-type braking mechanism normally encircling the housing of the transmission shown in FIG. 2.

FIG. 2 is an exploded perspective view with certain of the more external parts of the transmission cut away.

FIG. 3 is an exploded perspective view of internal parts of the transmission.

FIG. 4 is a view in longitudinal axial section showing the parts of FIGS. 1 to 3 in normal operative relationship within an assembled transmission.

FIG. 5 is a section taken along line 5—5 of FIG. 4 to detect the clutch mechanism of the transmission in a neutral position.

FIGS. 6 and 7 are sections of the transmission in respect to the same line of section as FIG. 5 but corresponding to speed-changing operation of the transmission in counterclockwise and clockwise directions, respectively.

FIG. 8 is an enlarged view as compared to FIG. 5 of components of the clutch mechanism.

In the first sheet of the drawings, FIGS. 1 to 3 show the transmission with its various components separated. FIG. 1 illustrates a conventional commercially available braking mechanism comprising brake shoes 5 and 6 connected by a link 7 adapted to encircle a surface 8 of the drum 9 of the transmission housing. The mechanism 4 further includes a solenoid 11 and a linkage system 12 for tightening or loosening the shoes relative to the surface 8.

FIG. 2 is illustrative of exterior components of the transmission including the housing, an input shaft 14, an internal gear 15 fixed thereto, and an output shaft 16 and the internal gear 17 fixed thereto. The housing components comprise the drum already named, end caps 18 and 19, and bearing sleeves 21 and 22 normally welded or otherwise attached to the caps 18 and 19, respectively, as shown in FIG. 4. As also shown in the latter figure, the caps 18 and 19 are secured to opposite ends of the drum by bolts.

FIGURE 3 illustrates a group of internal parts of the transmission which, when assembled, fit within a region enclosed by the drum 9 and the internal gears 15 and 17. Of this group, a rotor comprising a rotor body 24 and a locking plate 25 receives this plate on dowels 26 adapted to extend through plate apertures 27. The locking plate is secured to the body 24 axis-wise by a bolt 23. The rotor further comprises dowels or pins 31 and 32, respectively, in bearing relation with rollers 28 and 29. The rotor body 24 has bores 33 extending therethrough with their axes in parallel concentric relation with the axis of the rotor. The rotor supports, as shown in FIG. 4, three spindles 35, each of which comprises a shaft portion 36 and two gears 37, 38 at opposite ends of the shaft portion. As shown, the gear 38 is slightly larger in diameter than the shaft and the gear 37 is slightly smaller than the shaft.

Each spindle 35 etxends through the rotor body with its shaft portion in bearing relation with bearings internally of the respective bore 33. The spindle is secured with respect to the axial direction by a shoulder 39 adjacent the larger gear and a snap ring 41 (FIG. 4) insertable into a groove 42 (FIG. 3) to assume bearing relation with the end surface 44 of the locking roller plate 25. The locking roller plate has three bores 33a which are placed in registry with the bores 33 when the plate 25 is attached to the rotor body.

Hence, any one of the spindles 35 are insertable through the rotor body 24 and the locking plate 25 from the end of the rotor body to which the gear 38 is adjacent after assembly.

An important aspect of the invention is to provide structure enabling the housing to support the assembled rotor and the spindle 35 mounted therein. It is a further feature that this assembly of the rotor and spindles be movable into or out of its normal position within the drum 9 from one or both ends. In effecting these purposes, the drum 9 has internal flanges 48 and 49 each of which have notches 50 recessed radially outwardly from their internal circumferences along surfaces 51 The flanges 48 and 49 are spaced relative to themselves and to exterior end flanges 53 and 54 in the longitudinal direction of the drum.

The structure of the rotor body 24 cooperating with the flanges 48 and 49 requires that the circumference at which the flat crown surfaces 58 of longitudinally extending elongate ridges 59 of the rotor body occur be slightly less than that of the bottom surfaces of the notches 50 but greater than the circumference along which surfaces 51 are disposed. The ridges 59 are slightly shorter than the distance between the flanges 48 and 49 so that the ridges may freely traverse the region between the flanges during rotation of the rotor relative to the drum 9. At each end of a ridge 59, the rotor body has an arcuate recess 61, 62 in concentric relation with trunnions 31, 32. The arcuate surfaces of the recesses are of sufficient radius with respect to respective trunnions to enable rollers 28, 29 to be mounted and turn freely thereon. Each roller is retained on its respective trunnion by washer 64 and a cotter key. As shown in FIGS. 5 to 7, the rollers 28 and 29 engage the bottom surfaces of the notches 50 of the flanges 48 and 49, respectively, and engage the end surfaces of the notches to limit movement of the rotor relative to the housing. The notches are of sufficient arcuate length to enable rotor movement relative to the drum as to effect operation of the clutch mechanism hereinafter described.

The flanges 48 and 49 also serve as a base to which to bolt or otherwise secure a locking roller cage 65 and a rotor retaining ring 66 to the longitudinally outer surfaces of flanges 48 and 49, respectively, adjacent the end surfaces of the rotor body 24. In this manner the rotor is restricted from longitudinal movement relative to the drum 9. The cage 65 has a ring portion 67 similar to the ring 66 which in both instances overlaps the outer side surfaces of the rollers 28 and 29. The rotor and spindles are thus removable from either end of the drum 9 by removal of either the ring 66 or the cage 65.

Attention is now directed to a principle feature of the invention, i.e., the clutch mechanism. This mechanism has the purpose of locking the parts of the transmission from relative rotation, particularly, any rotation of the casing relative to the input shaft, and thus preventing a loss of direct drive relationship of the output shaft with the input shaft. This is a condition of operation permitted by complete disengagement of the brake 4 with the barrel surface 8 in which the housing, the input shaft, and the output shaft turn as a unit. A particularly outstanding feature of the clutch mechanism is that it enables operation of the output shaft at either of two speeds with equal facility in either direction of rotation.

The operation of the clutch mechanism now to be described is based upon the relative counter rotation of the housing and the rotor that results when the input shaft is turning, the brake is released, and the output shaft is subjected to appreciable resistance to turning. Clutching action is achieved by the structure described below through a frictional lock between the input gear and the rotor by frictional elements, i.e., a plurality of rollers or chocks 70 carried into and out of locking relation by the housing or parts fixed thereto.

As obvious from FIGS. 4 to 8, the input shaft 14 is connected in fixed concentric relation with the input gear 15. This gear has an axially extending flange 72 having an internal cylindrical surface 73 radially opposite the external peripheral surface 74 of the locking plate 25. The surface 74 includes a plurality of chordal flat areas 75 spaced along the circumference of the plate 25.

The cage or annulus 65 has a plurality of pairs of lugs 78, 79 extending in an axial direction from the ring 67. The pairs of lugs are equal in number to the flat areas 75 and are spaced in the same circumferential pattern so that the cage 65 may be attached to the flange 48 of the housing drum with a pair of lugs in outward radially adjacent relation with each flat area 75. Such disposition of the lugs disposes them in inward adjacent radial relation with the flange 72 of the gear 15 whereby if one of the rollers 70 is placed between a pair of lugs, e.g., the lugs 78 and 79 shown in enlarged view in FIG. 8, the roller is also positioned between the flange 72 and the surface 75 of the rotor plate 25.

Hence, the radially opposed surfaces of the flange 72 and the rotor plate 25 may be said to be divergent along a minor portion of their circumferences to form a region therebetween tapered in the circumferential direction. As described herein, each of these regions is tapered in opposite directions from its center to enable clutching action in both directions of rotation. The diameter of the roller 70 is smaller than the maximum dimension of this tapered region in a radial direction, but greater than the minimum dimension of this region so that the roller may wedge between the flange 72 and the locking plate 25 along the end portions of the flat area 75 as shown in FIGS. 6 and 7.

When the higher or "overdrive" speed of the output shaft is desired, the jaws of the brake 4 hold the housing from rotation. As may be observed from FIGS. 6 and 7 wherein a transmission is illustrated in counterclockwise and clockwise rotation, respectively, braking or retarding the speed of the housing in either case is the same as retarding the speed of the rollers 70 and will cause disengagement thereof from wedging relation with the flange 72 and the locking plate 25.

Upon release from a wedged position, the roller 70 is instantly urged to a neutral intermediate position between the lugs 78 and 79 as shown in FIGS. 5 and 8, by a pair of pushers 80. Each pusher comprises a head 81 in constant engagement with the roller 70. It further comprises a shaft portion in slidable guide relation with surfaces defining a bore 83 in its respective lug 78 or 79. The pushers 80 are resiliently urged toward the roller by means such as the springs 84 housed in the bore 83 between the pusher shaft and a pressed-in sleeve 85 through which the shaft portion 82 slides. It is important during "overdrive" operation to maintain the roller 70 out of frictional contact with the flange 72 which is then rotating relative to the substantially immobilized rotor and housing. To obtain this result, the faces 88 of the pushers lie in the planes 89 which are biased with respect to a radius 90 of the rotor extending through the roller and which meet, as shown in FIG. 8, in a dihedral angle radially outward from the rotor axis from the tapered region for receiving the roller. The pusher surfaces thus tend to maintain the roller 70 in contact with the chordal area 75. The pushers also urge the roller 70 at all times to a neutral position from which the roller is displaced only when such relative rotation between the housing and the rotor (body 24 and plate 25) occurs as to cause wedging of the roller between the rotor lock plate 25 and the gear flange 72.

The above described operation of the clutch mechanism makes more apparent the function of the rollers 28 and 29 and the fact that the relative rotation of the housing and the rotor is necessary merely to an extent for wedging of the roller 70 in either end of the tapered region defined by a flat area 75 and the internal flange surface 73. Good clutching action is dependent to a considerable extent upon the freedom of movement between the rotor and the casing provided by the rollers 28 and 29.

In a typical transmission in accordance with the invention, the ratio of circumference between the internal input gear and the spindle pinions in mesh therewith will be greater than the ratio of circumferences of the output gear with the pinions in mesh therewith. Hence, speed multiplication of the output shaft occurs when the rotor in which the planetary spindles are carried is immobilized. In this condition of operation the clutch mechanism will assume a relative position of the parts as shown in FIG. 5. FIG. 6 illustrates straight-through drive without multiplication when the direction of rotation is clockwise and looking in the rightward direction in FIG. 4. Assuming the same orientation of the transmission but changing the direction to counterclockwise, FIG. 7 illustrates the relative positioning of parts of the clutch mechanism.

The terms and expressions which have been employed are used as terms of description and not of limitation and there is no intention of excluding such equivalents of the invention described or of the portions thereof as fall within the scope of the claims.

What is claimed is:
1. A planetary speed-changing power transmission comprising:
 (A) an input gear and an output gear having a common axis of rotation;
 (B) a housing in concentric enclosing relation with said gears;
 (C) brake means for restraining rotation of the housing operably interposed between the housing and a base fixed externally of the transmission;
 (D) means connecting the housing and gears in journal-bearing relationship;
 (E) a rotor carried within the housing concentrically with said axis;
 (F) a spindle supported by the rotor for free rotation relative thereto and comprising gear means meshing with both of said gears to connect them in driving relationship;
  one of said gears and said rotor having axially-overlapping surfaces spaced at different radii from said common axis to dispose them in opposed radially-spaced relationship, one of said surfaces being arcuate and concentric to said axis and the other being convergent toward the other relative to the direction of its circumference to form a tapered region between said surfaces;
 (G) lug means fixed to said housing extending in an axial direction into said tapered region, the lug means being spaced in a circumferential direction to provide a gap therebetween within said region;
 (H) a chock loosely supported in said gap having a dimension in a radial direction relative to said axis less than the maximum spacing and greater than the minimum spacing between said overlapping portions within said tapered region; and
 (I) means for urging a chock to a circumferentially intermediate position within said gap.

2. The planetary speed-changing power transmission of claim 1 wherein said other surface of said axially-overlapping surfaces is convergent toward said one surface in opposite circumferential direction from the point of maximum spacing of said surfaces.

3. A planetary speed-changing power transmission comprising:
 (A) an input gear and an output gear having a common axis of rotation;
 (B) a housing in concentric enclosing relation with said gears;
 (C) brake means for restraining rotation of the housing operably interposed between the housing and a base fixed externally of the transmission;
 (D) means connecting the housing and the gears in journal bearing relationship;
 (E) a rotor carried within the housing concentrically with said axis;
 (F) a spindle supported by the rotor for free rotation relative thereto and comprising gear means meshing with both of said gears to connect them in driving relationship;
  one of said gears having a generally circular surface in axially-overlapping coaxial spaced relation with a generally circular surface of the rotor adjacent an end thereof;
  said overlapping circular surfaces being divergent along a minor portion of their circumferences to form a region therebetween tapered in a circumferential direction;
 (G) lug means fixed to said housing extending in an axial direction into said tapered region and being spaced in a circumferential direction to provide a gap therebetween within said region;
 (H) a chock loosely supported in said gap having a dimension in a radial direction relative to said axis less than the maximum spacing and greater than the minimum spacing between said circular surfaces within said tapered region; and
 (I) means for urging the chock to a circumferentially intermediate position within said gap.

4. A planetary speed-changing power transmission comprising:
 (A) an input gear and an output gear having a common axis of rotation;
 (B) a housing in concentric enclosing relation with said gears;
 (C) brake means for restraining rotation of the housing operably interposed between the housing and a base fixed externally of the transmission;
 (D) means connecting the housing and gears in separate journal bearing relationship;
 (E) a rotor carried internally of the housing concentric with said axis:
 (F) a spindle supported by the rotor for rotation relative thereto and comprising gear means meshing with both of said gears to connect them in driving relationship;
  one of said gears having a rink-like portion in axially overlapping and spaced, generally concentric relation with an end portion of the rotor;
  the opposed surfaces of said overlapping portions being convergent through a small angle about said axis in opposite directions from a point of maximum spacing to form a region therebetween tapered in opposite circumferential directions from said point;
 (G) lug means fixed to said housing and extending in an axial direction into said tapered region with portions thereof spaced in a circumferential direction to provide a gap therebetween within said region;
 (H) a chock loosely supported in said gap having a dimension in a radial direction relative to said axis less than said maximum spacing and greater than the minimum spacing between said overlapping portions within said region; and
 (I) means for urging the chock to a position within said gap in radial alignment with said maximum spacing.

5. A planetary speed-changing power transmission comprising:
 (A) an input gear and an output gear having a common axis of rotation;
 (B) a housing in concentric enclosing relation with said gears;
 (C) brake means for restraining rotation of said housing operably interposed between the housing and the structure fixed independently of the transmission;
 (D) means connecting the housing and the gears in journal bearing relationship;
 (E) a rotor carried internally of the housing concentrically with said axis;
 (F) stopping means on the housing and the rotor providing limited relative rotational movement;
  said rotor having a radially facing flat area tangent to a circumference concentric to said axis, and one of said gears having a cylindrical surface concentric to said axis and in spaced opposed relation with said area;
 (G) a spindle supported by the rotor for free rotation relative thereto and comprising gear means meshing with both of said gears and thereby connecting them in drive relationship;
 (H) lug means fixed to said housing extending in an axial direction into the region between said cylindrical surface and the flat area, and spaced in a tangential direction to provide a gap between said area and said cylindrical surface;

(I) a chock loosely supported in said gap having a dimension in a radial direction relative to said axis less than the maximum spacing and greater than the minimum spacing of said flat area from said cylindrical surface;

(J) and means for urging the chock to a position within said gap substantially centering it between adjacent lub means and out of contact with said cylindrical surface.

6. A planetary gear speed-changing transmission comprising:

(A) a pair of coaxial axially-spaced internal gears of different diameters;

(B) a housing having a wall providing an outer surface and an inner surface concentric to the axis of said gears;

(C) means connecting the housing and said gears in journal bearing relationship;

(D) a rotor supported by said housing therewithin in coaxial relation with said axis and providing a plurality of planetary-shaft bearings the axes of which extend lengthwise of said axis and are spaced along a surface of revolution concentric to said axis;

(E) brake means for restraining rotation of said housing operably interposed between the housing and structure fixed independently of the transmission;

(F) a like plurality of similar planetary spindles, each comprising a shaft and two external pinions of different diameters fixed to opposite ends of the shaft; each of said spindles being rotatably supported within the bearings of the rotor with the smaller and larger pinions in mesh with the smaller and larger internal gears, respectively;

said rotor having an end portion of generally cylindrical outer surface concentric to said axis, said outer surface comprising a plurality of flat areas tangential to a circumference smaller than that of said cylindrical surface;

(G) an annular in fixed concentric relation with the housing comprising a series of lugs spaced along a circumference within an annular region between said cylindrical surface and a radially opposed cylindrical surface of the adjacent internal gear; said lugs forming gaps therebetween spaced for registry with said flat areas; and (H) a chock loosely supported in each of said gaps having a dimension in a radial direction relative to said axis less than the maximum spacing and greater than the minimum spacing of the adjacent flat area with said cylindrical surface of the internal gear.

7. The transmission of claim 6 wherein: said chocks are cylindrical rollers and the transmission further comprises:

(A) a pair of pushers slidably mounted in the lugs adjacent each gap for movement in a common plane toward a roller in said gap; each pair of pushers having faces lying in the planes of a dihedral angle meeting radially outwardly of said gap; and (B) resilient means urging pushers toward said roller.

8. The transmission of claim 6 wherein the housing comprising:

(A) an internal flange having a circumferentially elongate notch open along the inner circumference of the flange;

said rotor having a periphery adapting it to pass axially through said flange;

(B) means mounted along the exterior of the rotor projecting into a limited portion of the angular length of said notch; and (C) means fixed to said housing retaining the rotor from substantial axial movement relative to the housing.

9. The transmission of claim 6 wherein:

the housing has a pair of axially spaced internal flanges, each flange having at least one circumferentially extending notch, and the transmission comprises:

(A) means projecting from the periphery of the rotor into a limited portion of angular length of each notch;

(B) an annulus carrying said lugs normally fixed to the side surface of one flange facing outwardly of one end of the casing, and (C) a retaining plate fixed to the opposite-facing surface of the other flange to retain said rotor in said housing.

10. The transmission of claim 6 wherein:

said housing comprises a drum and a pair of caps providing coaxial bearings normally fixed to and detachable from opposite ends of said drum;

said drum has a pair of axially spaced internal flanges, each spaced inwardly from an end of the drum and having at least one circumferentially elongate opening along the inner periphery of the flange; said rotor having a main portion spanning, and loosely received between, these flanges;

said annulus and a container ring are secured along the axially outer surfaces of the flanges to position the rotor lengthwise of the sleeve;

each of said internal gears is received in the space between a flange and an adjacent cap;

the internal gear adjacent said annulus has an axially-inward annular portion projecting into radially-outward axially-overlapping relation with said lugs and chocks;

said rotor having a minor disk portion affixed to a main portion to project axially therefrom to provide said flat areas; and each internal gear has a shaft fixed thereto extending through the adjacent one of said bearings.

References Cited in the file of this patent

UNITED STATES PATENTS 2,061,288    Murray  ---------------- Nov. 17, 1936

FOREIGN PATENTS 630,504    France ---------------- Aug. 23, 1927

UNITED STATES PATENT OFFICE
CERTIFICATE OF CORRECTION

Patent No. 3,125,901                    March 24, 1964

Charles E. Norton

It is hereby certified that error appears in the above numbered patent requiring correction and that the said Letters Patent should read as corrected below.

Column 6, line 27, for "rink-like" read -- ring-like --; column 7, line 41, for "annular" read -- annulus --.

Signed and sealed this 21st day of July 1964.

(SEAL)

Attest:

ESTON G. JOHNSON                      EDWARD J. BRENNER
Attesting Officer                       Commissioner of Patents